(No Model.)  2 Sheets—Sheet 1.
W. BURNLEY.
TELEPHONE TRANSMITTER.
No. 361,047. Patented Apr. 12, 1887.
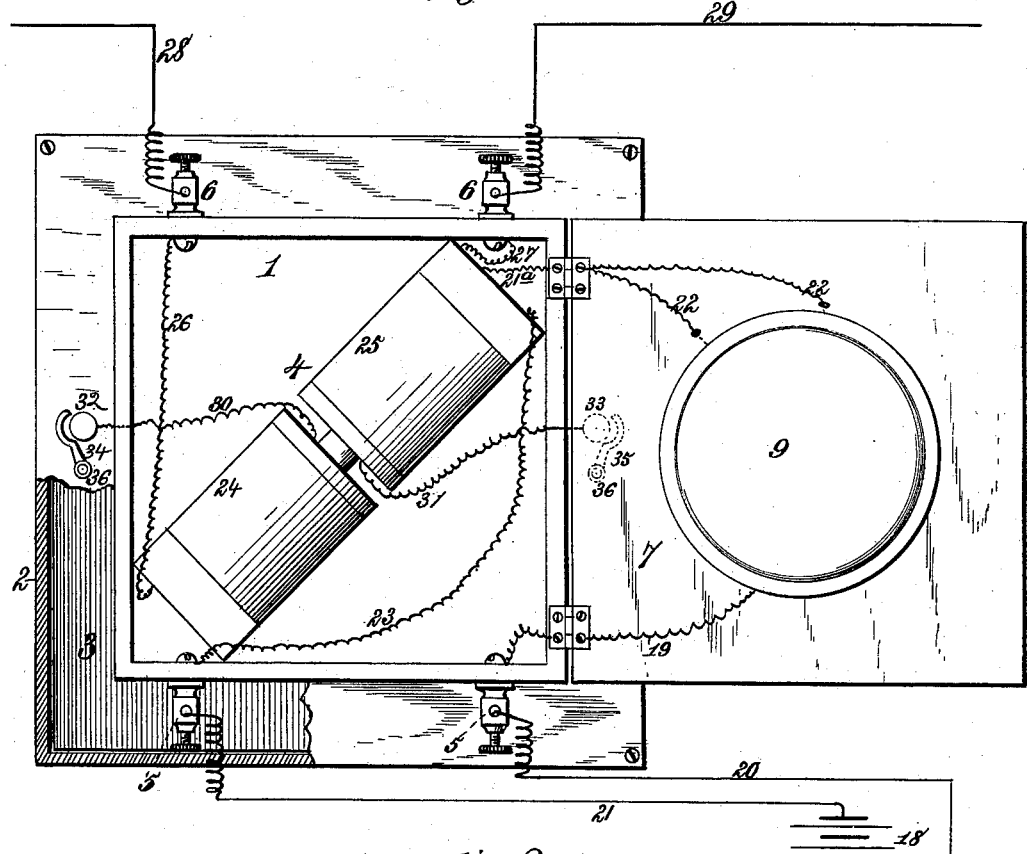
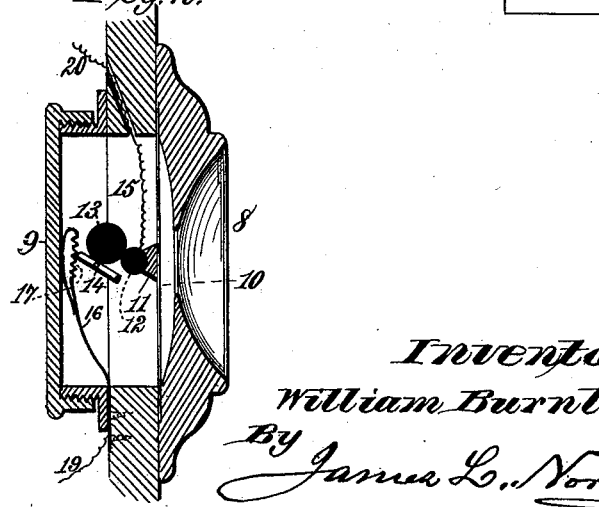
Witnesses.
Robert Errett.
George W. Rea
Inventor:
William Burnley.
By James L. Norris.
Atty.
N. PETERS, Photo-Lithographer, Washington, D. C.

(No Model.)  2 Sheets—Sheet 2.
W. BURNLEY.
TELEPHONE TRANSMITTER.
No. 361,047.  Patented Apr. 12, 1887.
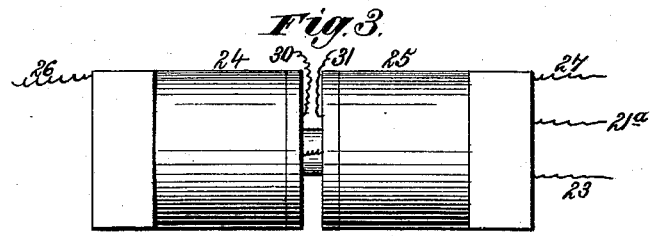
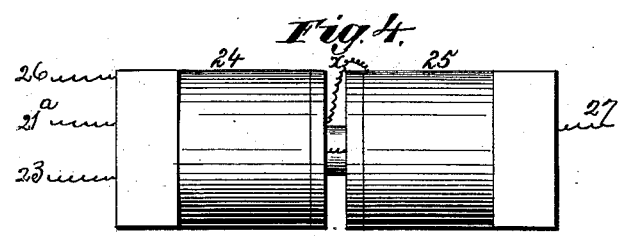
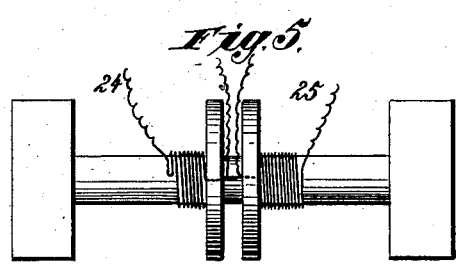
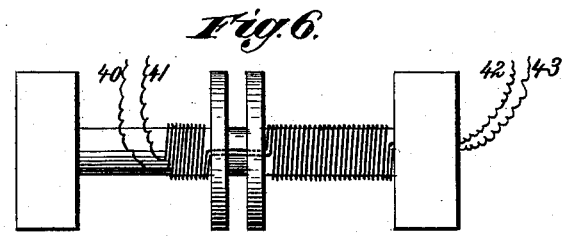
Witnesses,
Robert Everett
George W. Rea
Inventor
William Burnley
By James L. Norris
Atty.

United States Patent Office.

WILLIAM BURNLEY, OF NORTH EAST, PENNSYLVANIA, ASSIGNOR, BY DIRECT AND MESNE ASSIGNMENTS, OF PART INTEREST TO CHARLES A. HITCHCOCK, OF SAME PLACE, AND LEWIS F. WATSON, OF WARREN, AND SAMUEL A. DAVENPORT, OF ERIE, PENNSYLVANIA.

TELEPHONE-TRANSMITTER.

SPECIFICATION forming part of Letters Patent No. 361,047, dated April 12, 1887.

Application filed August 3, 1885. Serial No. 173,437. (No model.) Patented in England September 15, 1885, No. 10,950; in France September 15, 1885, No. 171,195, and in Spain January 16, 1886, No. 5,320.

To all whom it may concern:

Be it known that I, WILLIAM BURNLEY, a citizen of the United States, residing at North East, in the county of Erie and State of Pennsylvania, have invented new and useful Improvements in Telephonic Transmitters, (for which I have obtained patents in Great Britain, dated September 15, 1885, No, 10,950; in France, dated September 15, 1885, No. 171,195, and in Spain, dated January 16, 1886, No. 5,320,) of which the following is a specification.

This invention involves a novel construction and arrangement of devices in a telephonic system whereby I obtain great distinctness in the articulate sounds transmitted by a carbon telephone even over considerable distances, and also obviate the interfering effects of earth-currents. I attain such results by connecting a condenser with the secondary of a double or multiple inductorium, including in its circuit an ordinary telephonic receiver, the primary of said inductorium being connected in circuit with a microphonic transmitter of a special construction and a galvanic battery.

It is not my intention to broadly claim the introduction of condensers into telephonic lines, because I am aware that several arrangements of such condensers have been suggested. For example, in one instance a condenser has been placed in a shunt or branch around the electrodes of a microphonic transmitter for preventing the production of sparks and enabling the instrument to be used with heavier battery and larger induction-coils. Furthermore, I have knowledge of a system which involves the placing of condensers into a battery-circuit containing a microphonic transmitter or means for varying the resistance of the circuit, such condensers being what are known as "singing" condensers and capable of acting as telephonic receivers.

My invention differs from the above, since I make use of a condenser specially located in the secondary of an inductorium made up of a central core having the primary coil wound in two or more independent sections and surrounded by two or more secondary coils also wound in sections, the terminals of which are connected with the condenser and the circuit-wires of a telephonic receiver. It has been found by such arrangement that when the microphone or carbon transmitter and a galvanic battery are connected with the primary wires of the double or multiple induction-coil, and the extremities of the secondary wires with the poles of the condenser, all variations of resistance of the microphone determine a change corresponding to the difference of potential provided in the secondary circuit. It has also been ascertained that when an ordinary induction-coil is used the tone reproduced by the condenser is always an octave higher than that which puts the microphone into vibration, and hence articulate sound would not be emitted, and a separate battery included in the secondary circuit was required to retard the charging of the condenser and cause the production of sounds of the same pitch as those given before the microphone. In my present invention I make use of the induction-coil forming the subject-matter of Letters Patent granted to me on the 15th of September, 1885, No. 326,270, and by combining therewith a condenser in the manner hereinafter indicated I am enabled to transmit articulate sounds with great distinctness, since they become cleared of interfering tones and can be transmitted to greater distances.

The invention also consists in means for regulating the tension of the battery-current by variable contact-electrodes, one of which is carried by the diaphragm, while the other is loose and is free to roll on an inclined plate having means for changing the inclination thereof, as will be hereinafter described and claimed.

In the drawings, Figure 1 is a face view of a transmitter, showing the relative arrangement of the condenser, induction-coil, casing, and door carrying the mouth-piece and electrodes. Fig. 2 is a sectional view of the mouth-piece, diaphragm, and electrodes. Figs. 3, 4, 5, and 6 are detail views of various forms of induction-coils of two or more sections.

The reference-numeral 1 designates the casing or box of a telephonic transmitter, the base or back of which is formed of another box, 2, made sufficiently deep to inclose a condenser, 3, or instrument for concentrating electricity by the effect of induction. This condenser may consist of a confolded sheet of tin-foil whose layers are separated by a thin sheet having a non-conducting surface. It is of course obvious that any other approved form of condenser may be resorted to for attaining the results set forth.

The box 1 contains an induction-coil, 4, which is made in two sections wound in the special manner hereinafter explained, and said box is also provided with binding-posts 5 6 for making connection with the battery and line. A door, 7, hinged to the box 1, carries the transmitter proper, which consists of the shell or holder 15, the front mouth-piece, 8, screw-cap 9, and interior diaphragm or plate, 10. The latter bears on its rear side an india-rubber block, 11, which receives and holds a mass or stick of carbon. (Indicated by the numeral 12.) This mass or body constitutes a fixed electrode carried by the diaphragm, and is arranged in conductive relation to a loose carbon electrode or rolling body, 13, supported upon an inclined metal plate, 14. This plate has journals or gudgeons at its edges, which fit into recesses made in the shell 15, and allow said plate to be oscillated or tipped more or less to vary the contact-pressure or change the relative positions of the diaphragm-electrode and loose rolling electrode, these parts thus serving as a perfect tension-regulator for the battery-current.

The plate or platform 14 is held in a fixed position, and the angle thereof is regulated by means of a spring-tongue, 16, which is secured to the shell 15 by screws, and has notches 17 at its free end for the reception and retention of the entering edge of the plate 14.

It will be seen that the electrode 13, by virtue of its cylindrical shape, can roll or turn on the inclined platform or supporting-plane or have an axial movement without destroying its co-operation with the diaphragm-electrode.

The direction of the current from the battery 18 is through the wire 19, spring-tongue 16, movable electrode 13, and wires 20 and 21 of the opposite battery-poles to the induction-coil 4, the diaphragm, as has already been stated, being electrically insulated from the electrodes or blocks of carbon resistance material by the india-rubber block 11.

The induction-coil comprises the inner helix of wire surrounding an iron core and connected with the wire 20 by the terminal wire $21^a$, running into branches 22, as is seen in Fig. 1, and with the other pole of the battery by the wire 23.

The numerals 24 and 25 designate the secondary helices, which have their wires wound, respectively, from right to left and vice versa, as is seen in Fig. 3, or else said wires may be wound all to the right or all to the left, as is indicated in Fig. 4.

As is shown in Fig. 1, the outside terminals, 26 and 27, of the secondary helices are connected with the binding-posts 6 of the line-wires 28 and 29. The inner terminal wires, 30 and 31, of the secondary helices are connected with the opposite faces or ends of the condenser by means of binding-posts 32 and 33. In proper relation to these binding-posts are arranged switch keys or levers 34 and 35, which give the current that passes through the condenser a chance to go through a wire directly to the terminals 30 and 31 at the point 36. Such arrangement is to be used on a short line, if desirable.

Referring to Fig. 4, all the wires of the secondary helices are wound either to the right or to the left, either one of the terminals of the secondary and primary coils going, in this instance, to the condenser or to the line. It is preferred, however, to have the terminals at the middle of the coil go to the condenser at the point $x$.

In the detail Fig. 5 the secondary helices are wound to the left and right, the inner terminals in this instance going to the condenser, while the outer terminals go to the line and ground, the terminals of the primary coil, on the contrary, going to the battery, one direct and the other by way of the electrodes.

In Fig. 6 I have shown a multiple primary coil, in which 40 designates the outside terminal and 41 the inside terminal of one helix, while 42 and 43 indicate, respectively, the outer and inner terminals of the other helix.

It is to be observed that the induction-coil may be made of more than two sections, in which event the terminals, as aforesaid, may terminate in the same or a separate condenser.

The various forms of induction-coils herein represented are already covered by the patent heretofore referred to; but it has been found necessary to describe the same, in order to show how the connections are made with the transmitter, condenser, and line.

It has been found that the provision of a condenser as herein shown is of great advantage, since it adds materially to the force of the current. Experience has shown that the increase in force is from twenty-five to thirty-three and one-third per cent. Furthermore, the presence of such a condenser will serve to neutralize or partly neutralize the ground-currents which come upon the line, since it is evident that only very strong currents can pass through the condenser, while weaker currents are intercepted by the same.

I am aware that a telephone-transmitter has been devised in which a series of carbon balls are fitted in a glass tube that is carried by a diaphragm-frame and jointed to a stand or support, so as to vary the inclination of the parts. My transmitter differs from the instrument referred to, since I make use of a diaphragm mounted on a stationary frame and an independent inclined frame capable of having its inclination varied for the object already stated.

Having thus described my invention, what I claim is—

1. The combination, with a microphone or battery-transmitter and an inductorium having several secondary coils, of a condenser connected with said coils, the other terminals thereof being connected with the circuit of the telephonic receiver, and the primary coil of said inductorium being included in the transmitter-battery circuit, substantially as described.

2. In a telephone-transmitter, the combination, with a fixed frame or holder and a diaphragm mounted thereon, of an inclined plane or platform, a loose rolling electrode supported upon said inclined plane, an electrode upon the diaphragm, and means for varying the angle of the inclined plane to change the contact-pressure between the loose and diaphragm electrodes, substantially as herein set forth.

3. The combination of the tilting metal plate or platform 14 and spring-tongue 16, having notches 17, with the loose or rolling electrode and the diaphragm carrying a fixed electrode, substantially as described.

In testimony whereof I affix my signature in presence of two witnesses.

WILLIAM BURNLEY.

Witnesses:
DYER LOOMIS,
E. S. SULLIVEN.